United States Patent
Gilmore et al.

(10) Patent No.: US 7,347,731 B1
(45) Date of Patent: Mar. 25, 2008

(54) SUBMERSIBLE ACCESSORY CONNECTOR

(75) Inventors: Peter B. Gilmore, Plantation, FL (US); Donald F. Gatto, Coral Springs, FL (US); Weng Kong Hor, Buttersworth (MY); Bharathi Ranjit Singh, Petaling Jaya (MY); William R. Williams, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/534,267

(22) Filed: Sep. 22, 2006

(51) Int. Cl.
  *H01R 13/40* (2006.01)
(52) U.S. Cl. ...................................... 439/587; 439/606
(58) Field of Classification Search ................ 439/606, 439/587
  See application file for complete search history.

(56) References Cited

U.S. PATENT DOCUMENTS 5,725,392 A * 3/1998 Bianca et al. ............... 439/590
6,402,552 B1 * 6/2002 Wagner ...................... 439/606
6,827,615 B2 * 12/2004 Axelsson .................... 439/885

* cited by examiner

*Primary Examiner*—Truc Nguyen

(57) ABSTRACT

An accessory connector (102) and a method (200) for providing a robust submersible seal is provided. The method can include over molding (202) a high-temperature plastic (122) around a plurality of interconnect pins (112) to produce a header (120), over molding (204) a low-temperature plastic (132) to the header to produce an insert (130), over molding (206) a side connector assembly (142) along a periphery of the insert to produce an interface (140), and ultrasonically welding (212) the insert to a housing (151) to blend (153) the low-temperature plastic with the housing.

14 Claims, 6 Drawing Sheets

EXTERIOR VIEW

EXTERIOR VIEW                    HEADER

EXTERIOR VIEW

INSERT

SUBMERSIBLE ACCESSORY CONNECTOR

FIELD OF THE INVENTION

The present invention relates to mobile devices, and more particularly, to design.

BACKGROUND

The use of portable electronic devices and mobile communication devices has increased dramatically in recent years. Moreover, the demand for mobile devices that can interface to other devices or systems is increasing. Furthermore, customers desire robust interconnections between mobile communication devices and accessories, such as remote speaker microphones. The interface connection between the devices should be highly durable, water resistant, low cost, highly reliable, and space efficient.

Mobile device can connect with one another via wired or wireless interfaces. When a wired interface is used, it is important to ensure a good connection between electrical components and supporting material. For example, a wired interface may include pins inserted into a plastic connector. Prior art methods can employ insert molding techniques to insert sheet metal pins into a plastic connector. However, sheet metal pins insert molded into plastic can develop leaks around the pins due to uneven shrink rates between metal and plastic. Other prior art techniques employ interconnect sockets for connecting contact pins. Interconnect sockets are a form of pressure contact interconnect. However, interconnect sockets take up space, cost money and introduce reliability concerns.

Other prior art techniques employ direct soldering of the pins. However, the high temperature of the solder reflow process can soften the plastic holding the pins and degrade the integrity of the insert molded seal surrounding the pins. Heat applied to the metal pins can transfer the heat to the plastic and degrade the interface between the pins and the plastic. One solution to mitigate heat transfer is to insert mold pins in a very high temperature plastic. However, the high temp plastics have very poor melting properties when welded to a plastic housing. The integrity of the bonding between the high temperature plastic and the plastic housing is then degraded. Accordingly, the interface connector is subject to cracking and leaks. A need therefore exists for an interface and process technique which provides high integrity interface connections.

SUMMARY

Embodiments of the invention are directed to an interface and method for providing a submersible seal. One embodiment of the invention is directed to an accessory connector. The connector can include a plurality of interconnect pins, a high-temperature plastic that is over molded around the plurality of interconnect pins to produce a header, and a low temperature plastic that is over molded around the header to produce an insert. The header can withstand interconnect pin dislocations due to high temperature soldering of the interconnect pins and provide a first water seal. An over molded portion of the low temperature plastic and the high-temperature plastic can provide a second water seal. The connector can further include an adhesive side connector assembly for placement around a periphery of the insert such that the side connector assembly is compressed between the insert and a housing of the device for providing a third water seal. The side connector assembly can couple the interface to the housing to provide a fourth water seal. The connector can include an ultrasonic weld between the insert and a housing of the device. A material of the housing has a similar melt type to the low temperature plastic to accommodate a melting of the housing and the low temperature plastic to provide a faith water seal. The combination of the ultrasonic weld and the adhesive can provide a water resistant and submersible seal.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

Figure 1:
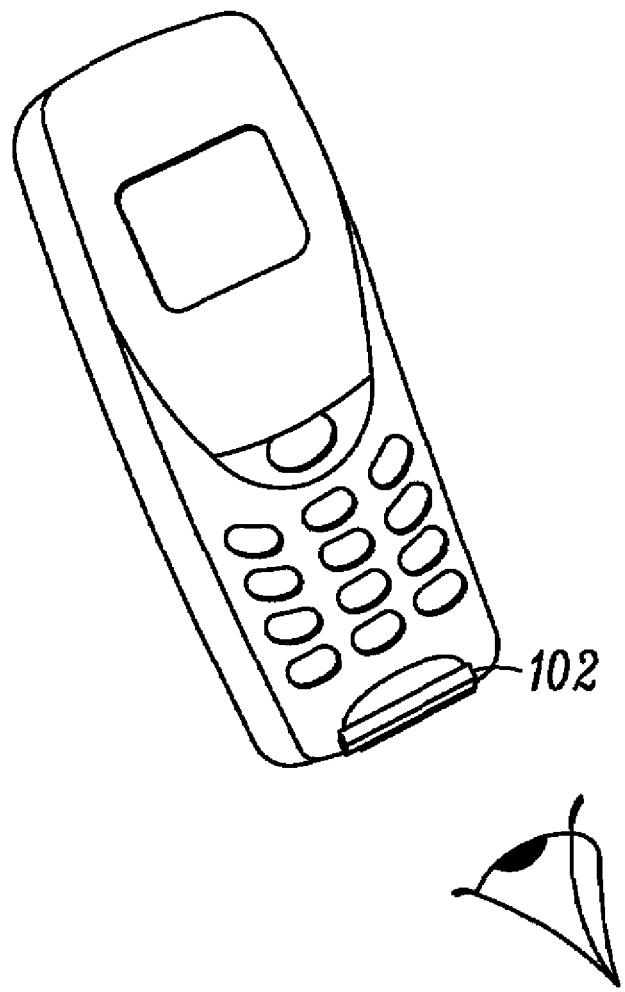
FIG. 1 is an illustration of a mobile device and interface in accordance with the embodiments of the invention.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "insert molding" can be defined as a process of molding plastic around preformed metal inserts, that is compatible with both thermoplastic and thermoset materials. The term "over molding" can be defined as a process in which a mold cavity is first partially filled with one plastic and then a second shot is injected to encapsulate the first shot. The term "high-temperature plastic" can be defined as a plastic that withstands softening or deformity due to high temperature soldering on one or more metal components in the plastic. The term "low-temperature plastic" can be defined as a plastic that may soften or deform due to high temperature soldering on one or more metal components in the plastic.

Briefly, insert molding is the process of injecting polymer around another core material. The core material can be another polymer, a ceramic perform or a metal component. The resulting molding is a single-piece, encapsulated or perimeter molded, finished part. The structures and tolerances achievable with insert molding demonstrate strong dimensional stability without the use of fasteners, adhesives or other assembly methods. An insert molding process allows multiple components to be placed within a cavity or part with a single over-molding or injection operation. Insert molding can produce complex parts that are not possible with conventional molding techniques. For example, a pre-mold core can be positioned in a mold cavity and over-molded with a compatible polymer to obtain critical dimensions with minimum dimensional change due to shrinkage or contraction from cooling. The over-molded part will exhibit the performance characteristics of the polymers used without sinks and voids in thick sections of the final part.

Referring to FIG. 1, a mobile device 100 is shown. The mobile device 160 may be a cell phone, hand-held radio, a two-way radio, a portable media player, a music player, a handheld game device, an emergency communication radio, or any other suitable communication device. The mobile device 100 can include an interface 102 operatively coupled to the mobile device 100. The interface 102 can electronically couple the mobile device 100 to one or more other external devices. For example, the interface 102 can provide a wired connection to another device capable of receiving the connection. In one arrangement, the interface 102 can include a plurality of pins that can mate to a connection cable dispensed between the mobile device 102 and the external device.

Briefly, the interface 102 is attached to the mobile device 100 through a plurality of a water resistant and submersible seals. The seals are the result of a combination of over molding processes and adhesive processes that ensure a water resilient connection between multiple plastic materials of the interface 102 and the mobile device 100. In one arrangement, the interface can comprise a plurality of pins insert molded into a high-temperature plastic to produce a header. This header can then be placed into a second mold where a low-temperature plastic can be over molded onto the header to produce an insert. A rubber side assembly can also be over molded on the insert to produce the interface and provide a pressure seal. Alternatively, a VHB (very high bond) adhesive can be added to the perimeter of the interface and/or the insert to provide a submersible seal. A flexible ribbon attachment can then be soldered to the header assembly. The interface can be assembled onto a housing of the mobile device 100 and ultrasonically welded into place. The ultrasonic welding process blends the low temperature plastic with the housing to provide a water resistant seal. The interface provides a strong mechanical attachment to the housing due to the ultrasonic joint created by the ultrasonic welding and rubber side assembly, or the VHB bond, that creates the submersible seal. The interface 102 creates a low cost, high lifecycle, robust, submersible universal connector assembly.

Figure 2:
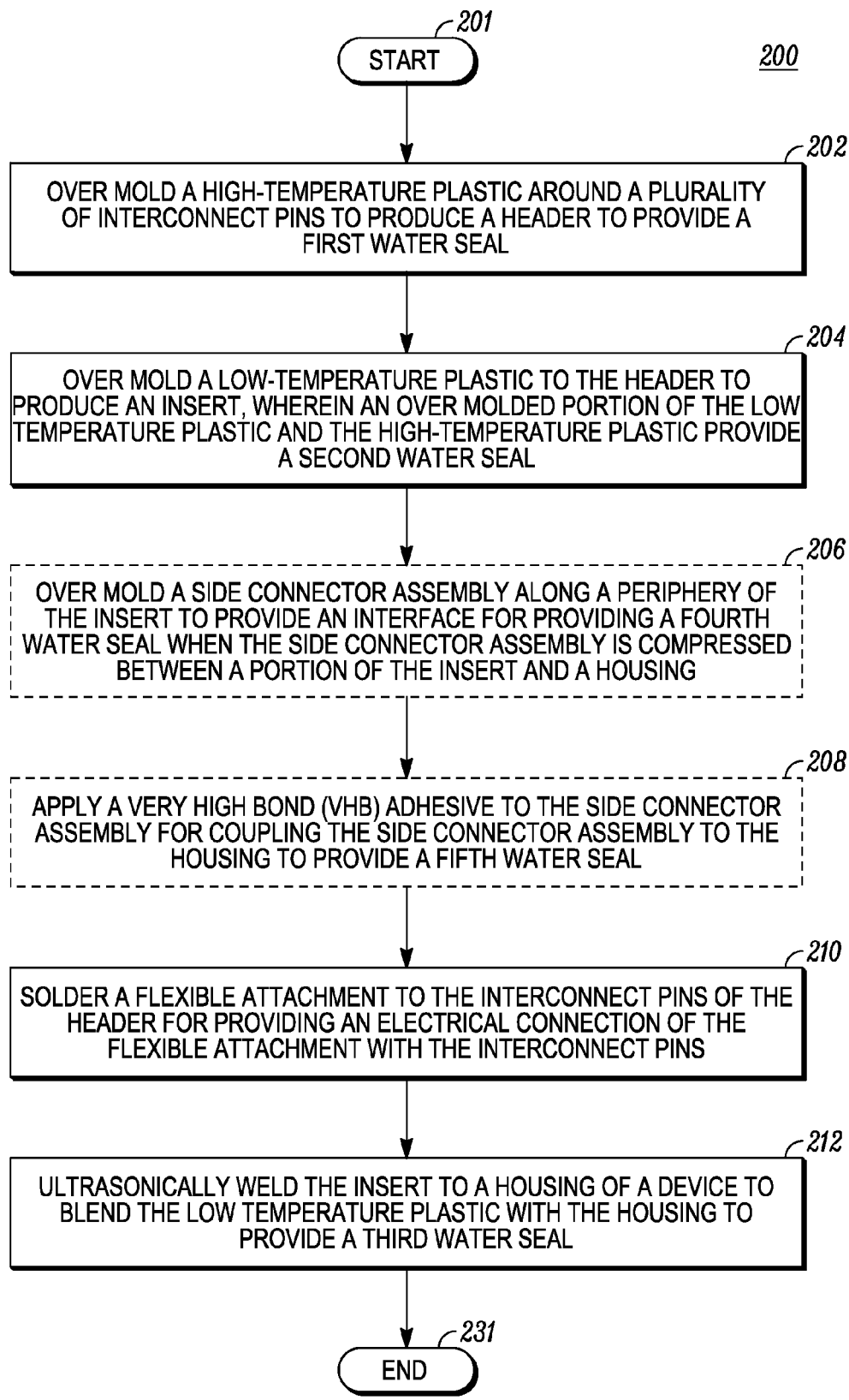
FIG. 2 is a method for over molding an interface in accordance with the embodiments of the invention.
Figure 3:
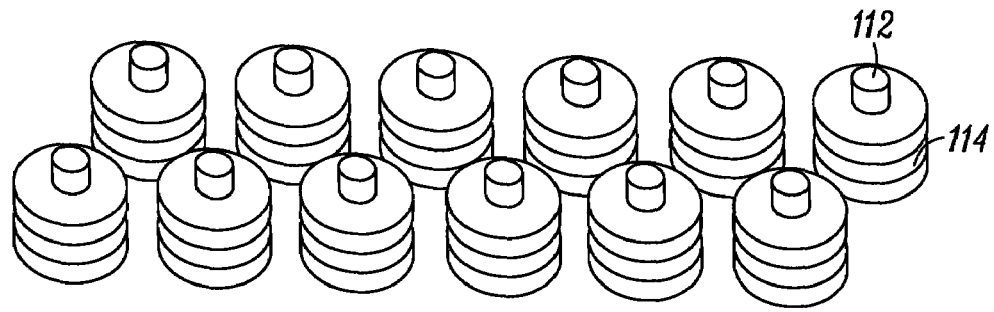
FIG. 3 is an exterior view of interconnect pins of the interface of FIG. 1 in accordance with the embodiments of the invention.
Figure 4:
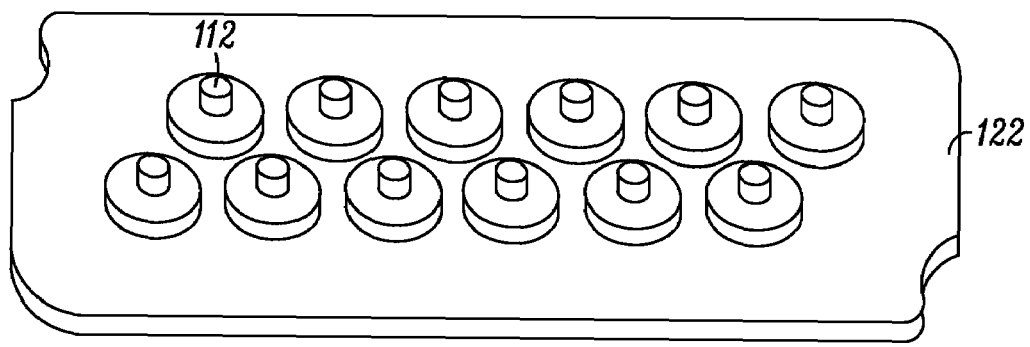
FIG. 4 is a exterior view of a header of the interface of FIG. 1 in accordance with the embodiments of the invention.
Figure 5:
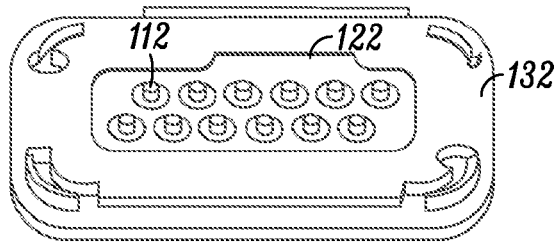
FIG. 5 is a exterior view of an insert of the interface of FIG. 1 in accordance with the embodiments of the invention.

Referring to FIG. 2, a method 200 for creating an interface is shown. The method 200 can be practiced with more or less than the number of steps shown. To describe the method 200, reference will be made to FIGS. 1 and 3-11 although it is understood that the method 200 can be implemented in any other manner using other suitable components. Moreover, the method 200 is not limited to the order in which the steps are listed in the method 200 In addition, the method 200 can contain a greater or a fewer number of steps than those shown in FIG. 2.

At step 201 the method can start. The method 200 can start in a state wherein a plurality of interconnect pins are over molded. Referring to the illustration of FIG. 3, the interconnect pins 112 can be loaded in a mold. A mold can secure the interconnect pins 112 in place prior to over molding. In one arrangement, the interconnect pins 112 may be gold platted for enhancing conductivity. The interconnect pins 112 may also be round in shape for providing a robust seal with an over molded high-temperature plastic. An interconnect pin 112 may also have a grooved ledge 114 that goes all the way around the pin for press fitting into the plastic during over molding. The grooved ledge allows a reflow of the over molded high-temperature plastic to surround the grooved ledge and withstand high soldering temperatures of the pins for providing a robust seal with the over molded high-temperature plastic.

Returning to the method 200 of FIG. 2, at step 202, a high-temperature plastic can be molded around a plurality of interconnect pins to produce a header. Notably, a high-temperature plastic of the header can withstand interconnect pin dislocations due to high temperature soldering of the interconnect pins. Referring to the illustration of FIG. 4, the header 120 is shown. The high-temperature plastic 122 is over molded to the interconnect pins 112 to produce the header 120. The high-temperature plastic 122 surrounding each pin in the header 120 provides a water sealed joint that can remain intact after reflow soldering on the interconnect pins 112. The high-temperature plastic 122 over mold surrounds the pins and leaves at least a tip of the interconnect pins 112 bare for providing conductivity. The grooved ledge 114 around the pins also allows for a pressure fitting as the over molded high-temperature plastic 122 encapsulates and submerges the grooved ledge 114 of the pin. The over molding of the interconnect pins 112 to the high-temperature plastic 122 to produce the header 120 provides a first water seal.

Returning to the method 200 of FIG. 2, at step 204, a low-temperature plastic can be over molded to the header to produce an insert. Recall, the header 120 is the product of the over molding of the high-temperature plastic 122 to the interconnect pins 112 (See FIG. 4). Referring to the illustration of FIG. 5, the insert 130 is shown. The low temperature plastic 132 can be over molded to the high-temperature plastic 122 of the header 120 to produce the insert 130. An overlap of the low temperature plastic 132 and the high-temperature plastic 122 provides a second water seal. The insert 130 can expose a first end of the plurality of interconnect pins to an exterior of the device, and expose a second end of the plurality of interconnect pins to an interior of the device. Briefly, referring to FIG. 1, the exterior corresponds to the outside of the mobile device 100, and the interior corresponds to inside of the mobile device 100.

Figure 6:
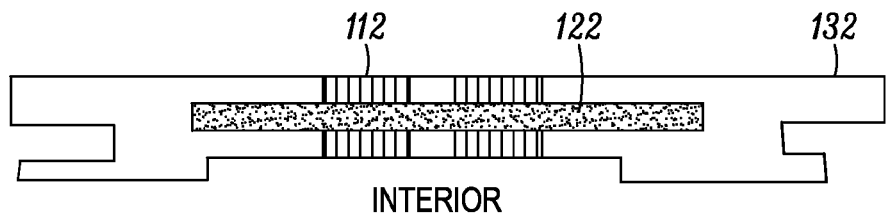
FIG. 6 is a cross section view of the insert of FIG. 5 in accordance with the embodiments of the invention.

Referring to the cross section view of the insert 130 in FIG. 6, a first design of the low-temperature plastic over molding to the high-temperature plastic is shown. In particular, the low-temperature plastic 132 can completely surround the interconnect pins 112 and encapsulate the high-temperature plastic 122. Reflow soldering on the interconnect pins may soften the low-temperature plastic 132 in contact with the interconnect pins, though the water resilient seal of the high-temperature plastic 122 and the interconnect pins 112 will be maintained. The interconnect pins can be completely surrounded by the low-temperature plastic 132 to cover flow lines in the high-temperature plastic 122 created from the over molding in method step 202.

Figure 7:
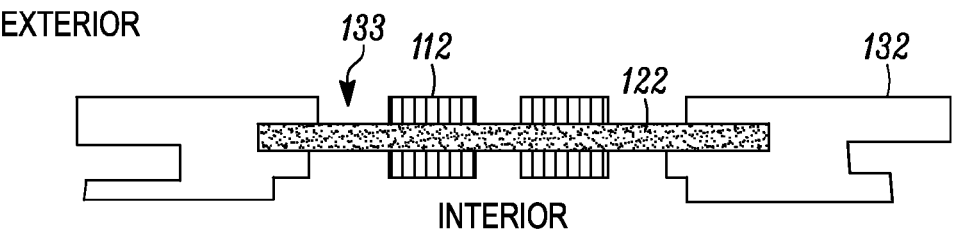
FIG. 7 is another cross section view of the insert of FIG. 5 in accordance with the embodiments of the invention.
Figure 8:
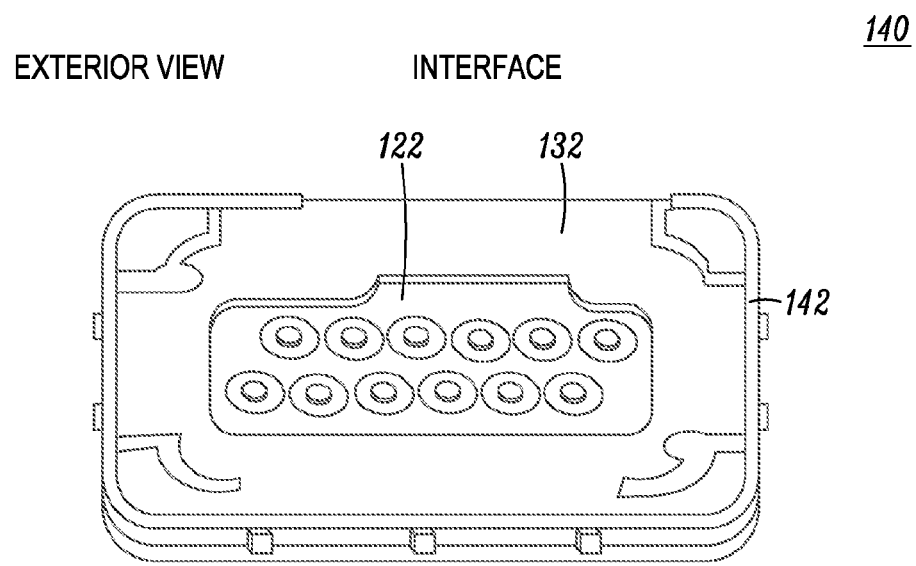
FIG. 8 is a exterior view of the interface of FIG. 1 in accordance with the embodiments of the invention.

Referring to FIG. 7, another cross section view of the insert 130 is shown. In particular, a second design of the low-temperature plastic over molding to the high-temperature plastic is shown. Notably, the low-temperature plastic 132 may not completely surround the interconnect pins 112 and encapsulate the high-temperature plastic 122. Accordingly, reflow soldering on the interconnect pins 112 will not soften the low-temperature plastic 132 which is not contact with the interconnect pins. The water resilient seal of the high-temperature plastic 122 and the interconnect pins 112 will be maintained.

Returning to the method 200 of FIG. 2, at step 206, a side connector assembly can be over molded along a periphery of the insert to produce an interface. Recall, the insert 130 is the product of the over molding of the low-temperature plastic 122 to the header 120 (See FIG. 5). Referring to the illustration of FIG. 8, the interface 140 is shown. A rubber side assembly 142 can be over molded to the insert 130 to produce the interface 140. The side assembly 142 may be rubber or any other material that can adhesively bond to the insert 130 or a housing to which the interface 140 will be coupled. The over molding of the rubber side assembly to the insert 130 can provide a fourth water seal when the interface is compressed within a housing of the device. In another embodiment, the rubber side assembly can be removed and a Very High Bond (VHB) adhesive can be used in place to provide a submersible seal. That is, either the rubber side assemble 142 or a VHB adhesive can be used to provide a water tight seal.

Figure 9:
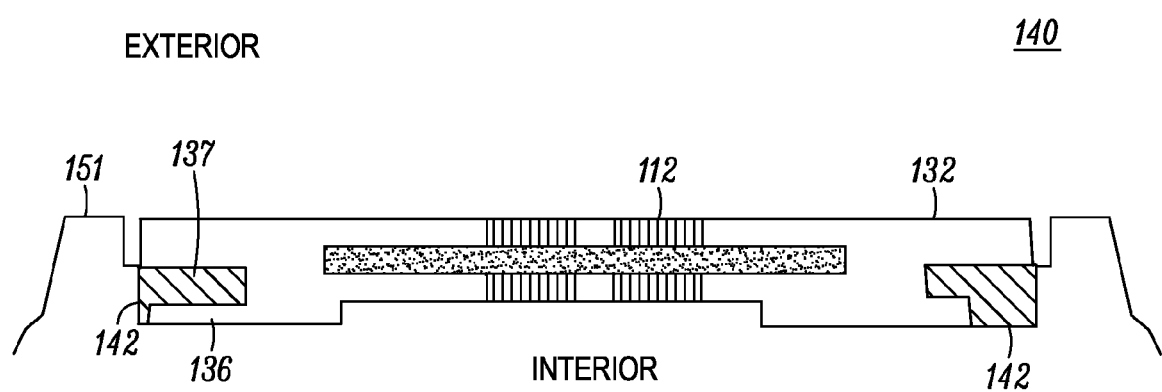
FIG. 9 is cross section view of the interface of FIG. 8 in accordance with the embodiments of the invention.
Figure 10:
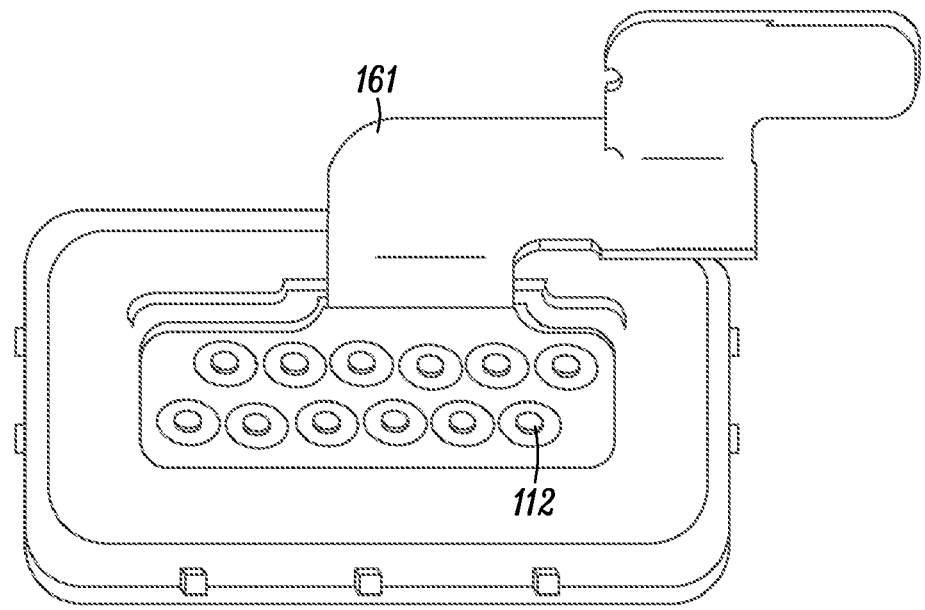
FIG. 10 is a interior view of the interface with an attached flexible ribbon cable in accordance with the embodiments of the invention.

For example, referring to the cross section of the interface 140 in FIG. 9, the rubber side assembly 142 can create a pressure seal between the low-temperature plastic 132 and a housing 151 of the mobile device. The low temperature plastic 132 of the insert can include a ridge 136 for mating the insert to a protrusion 137 of the rubber side connector assembly 142. The ridge 136 facilitates a holding of the rubber side assembly 142 in place. Moreover, at step 208 of the method 200 of FIG. 2, the rubber side connector assembly 142 couples the side connector assembly 142 to the housing 151 to provide a fifth water seal.

It should also be noted that over molding a side connector and applying the VHB adhesive is optional. That is, method steps 206 and 208 are optional method steps for providing a further level of water resistant sealing; in particular, a submersible seal. Notably, the interface 140 can be produced without the rubber side assembly or the adhesive. The interface 140, without the side assembly 142, can be assembled and ultrasonically welded within a housing directly. The rubber side assembly 142 provides a submersible seal that accommodates for variation of the contact between the interface 140 and the housing 153. For certain applications, adding a further level of water resistance using method steps 206 and 208 may be overly costly and unnecessary.

Returning to the method 200 of FIG. 2, at step 210, a flexible attachment can be soldered to the interconnect pins of the header for providing an electrical connection of the flexible ribbon with the interconnect pins. For example, referring to FIG. 10, a flexible ribbon attachment 161 can be manually soldered to the interconnect pins 112 of the interface 140 (See FIG. 8). The soldering can be performed by a machine or by hand. Notably, the high temperature of the soldering does not affect the integrity of connections within the header 120, the insert 130, or the interface 140. That is, the water resilient seals provided by the method steps 202-208 are not affected by the soldering process. Briefly referring to FIG. 11, the solder joint 162 of the flexible attachment 161 provides an electrical coupling to an interior of the mobile device and an exterior of the mobile device as discussed in FIG. 1.

Returning to the method 200 of FIG. 2, at step 212, the insert can be ultrasonically welded to a housing of the device to blend the low-temperature plastic with the housing to provide a third water seal. Briefly, ultrasonic welding is an assembly process in which two materials are joined by the local application of pressure and high-frequency vibratory energy. Ultrasonic welding introduces high frictional vibration of the materials which causes the materials to melt together. A good ultrasonic weld can be created between two plastics having similarly melt temperatures. Welding two low-temperature plastics can produce a strong weld since the materials have a similar melt types. Welding a low-temperature plastic with a high-temperature plastic may not result in a good weld. Accordingly, the low-temperature plastic 122 of the interface 140 is chosen to have a similar melt type with the material of the housing 151. For example, the plastics may be a polycarbonate (e.g. blend of plastics) material of the same melt type for providing a strong weld. The strong weld provides high water resistance.

Figure 11:
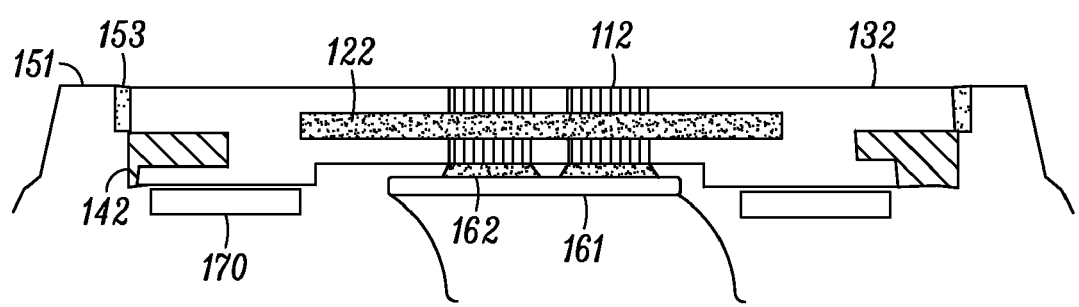
FIG. 11 is cross section view of the interface of FIG. 10 in accordance with the embodiments of the invention.

Referring to FIG. 11, a detailed cross section of the final interface 140 is shown. In particular, the low-temperature plastic 132 can be ultrasonically welded to a material of the housing 153. The step 212 of ultrasonic welding can create an ultrasonic weld 153 that blends together the low-temperature plastic 132 and the housing 151 to provide a water resilient seal. The ultrasonic weld 153 provides a first layer of water resistance. Moreover, the rubber side assembly 142 provides a submersible seal. If the rubber side assembly is not used, a VHB bond can provide a submersible seal in place of the rubber. The combination of the ultrasonic weld and the rubber side assembly seal, or the strong bond of the VHB adhesive, creates a submersible seal.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. An accessory connector to a device, that is water-resistant and submersible, comprising:
   a plurality of interconnect pins;
   a high-temperature plastic that is over molded around the plurality of interconnect pins to produce a header, wherein the header withstands interconnect pin dislocations due to high temperature soldering of the interconnect pins and provides a first water seal; and
   a low temperature plastic that is over molded around the header to produce an insert, wherein an over molded portion of the low temperature plastic and the high-temperature plastic provides a second water seal.

2. The accessory connector of claim 1, further comprising:
   a rubber side connector assembly for placement around a periphery of the insert such that the side connector assembly is compressed between the insert and a housing of the device for providing a third water seal.

3. The accessory connector of claim 1, further comprising:
   an ultrasonic weld between the insert and a housing of the device, wherein a material of the housing has a similar melt type to the low temperature plastic to accommodate a melting of the housing and the low temperature plastic to provide a fourth water seal.

4. The accessory connector of claim 1, further comprising:
   a flexible attachment soldered to the plurality of interconnect pins to the device for electrically coupling the interconnect pins with the device.

5. The accessory connector of claim 2, wherein the insert includes a ridge coupled to a protrusion of the adhesive side connector assembly.

6. The accessory connector of claim 1, wherein the low temperature plastic over molded to the header surrounds the pins and leaves a tip of the interconnect pins bare for providing conductivity.

7. The accessory connector of claim 1, wherein the plurality of interconnect pins are round in shape for providing a robust seal with the over molded high-temperature plastic.

8. The accessory connector of claim 1, wherein the plurality of interconnect pins have a grooved ledge for allowing a reflow of the over molded high-temperature plastic to surround the grooved ledge and withstand high soldering temperatures of the interconnect pins.

9. The accessory connector of claim 1, wherein the insert is mounted flush within the device and exposing a first end of the plurality of interconnect pins to an exterior of the device, and exposing a second end of the plurality of interconnect pins to an interior of the device.

10. A mobile device connector, that is water-resistant and submersible, comprising:
    a plurality of interconnect pins;
    a high-temperature plastic that is over molded around the plurality of interconnect pins to produce a header, wherein the header withstands interconnect pin dislocations due to high temperature soldering to provide a first water seal; and
    a low temperature plastic that is over molded around the header to produce an insert, wherein an over molded portion of the low temperature plastic and the high-temperature plastic provides a second water seal.

11. The mobile device connector of claim 10, further comprising:
    A rubber side connector assembly for placement around a periphery of the insert such that the side connector assembly is compressed between the insert and a housing of the device for providing a third water seal.

12. The mobile device connector of claim 10, wherein the insert includes a ridge for mating the insert to a protrusion of the side connector assembly.

13. The mobile device connector of claim 10, further comprising:
    a flexible attachment soldered to the plurality of interconnect pins to the device for electrically coupling the interconnect pins with an electronic board of the mobile device,
    wherein the over mold surrounds the pins and leaves at least a tip of the interconnect pins bare for providing conductivity.

14. The mobile device connector of claim 10, wherein the plurality of interconnect pins are round for providing a robust seal with the over molded high-temperature plastic, and have a grooved ledge for allowing a reflow of the over molded high-temperature plastic to surround the grooved ledge and withstand high soldering temperatures of the pins for providing a robust seal with the over molded high-temperature plastic.

* * * * *